United States Patent
Hammarwall et al.

(10) Patent No.: US 8,619,904 B2
(45) Date of Patent: Dec. 31, 2013

(54) CHANNEL-ASSISTED ITERATIVE PRECODER SELECTION

(75) Inventors: David Hammarwall, Stockholm (SE); George Jöngren, Karlsviksgatan (SE); Stefano Sorrention, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 378 days.

(21) Appl. No.: 13/124,817

(22) PCT Filed: Oct. 31, 2008

(86) PCT No.: PCT/SE2008/051241
§ 371 (c)(1),
(2), (4) Date: Apr. 18, 2011

(87) PCT Pub. No.: WO2010/050862
PCT Pub. Date: May 6, 2010

(65) Prior Publication Data
US 2011/0211628 A1    Sep. 1, 2011

(51) Int. Cl.
*H04K 1/02* (2006.01)
(52) U.S. Cl.
USPC .......................................................... 375/296
(58) Field of Classification Search
USPC ......... 375/295, 296, 259, 285, 354, 358, 316, 375/340; 455/91, 114.2, 114.3, 7, 24, 73
See application file for complete search history.

(56) References Cited

U.S. PATENT DOCUMENTS

2007/0098106 A1*  5/2007  Khojastepour et al. ....... 375/267
2007/0280116 A1* 12/2007  Wang et al. ................... 370/236
2008/0049709 A1*  2/2008  Pan et al. ....................... 370/344
2008/0159425 A1   7/2008  Khojastepour et al.
2009/0323849 A1* 12/2009  Bala et al. ..................... 375/267

FOREIGN PATENT DOCUMENTS

| EP | 1 919 098 A1 | 5/2008 |
| JP | 2008-125068 A | 5/2008 |
| WO | WO 2007/050860 A1 | 5/2007 |

OTHER PUBLICATIONS

International Search Report, PCT Application No. PCT/SE2008/051241, Sep. 25, 2009.

(Continued)

*Primary Examiner* — Sam K Ahn
*Assistant Examiner* — Vineeta Panwalkar
(74) *Attorney, Agent, or Firm* — Myers Bigel Sibley & Sajovec, P.A.

(57) ABSTRACT

As a basis for precoder quantization, a channel matrix representing multi-antenna channel characteristics between a transmitter and a receiver in the mobile communications network is estimated (S1). A channel-assisted vector selection procedure (S2-S4) for iteratively selecting precoding vectors for a precoding matrix is performed. Each of a number of iterations of the novel iterative vector selection procedure generally involves evaluation (S2) of the performance of each one of a set of candidate vectors included in a given vector codebook with respect to a predetermined performance measure that is dependent on the estimated channel matrix, and selection (S3) of one of the set of candidate vectors as a respective precoding vector for the precoding matrix based on the evaluated performance. Information representative of a set of selected precoding vectors is then compiled (S5) to form a quantized representation of the precoding matrix for transmission to the transmitter side.

33 Claims, 12 Drawing Sheets

(56) References Cited

OTHER PUBLICATIONS

Bala et al. "Zero-Forcing Beamforming Codebook Design for MU-MIMO OFDM Systems" *Proceedings of the 68$^{th}$ IEEE Vehicular Technology Conference*, VTC Fall 2008 (Sep. 21-24, 2008) pp. 1-5.

Trivellato et al. "Antenna Combining and Codebook Design for the MIMO Broadcast Channel with Limited Feedback" *IEEE Conference Record of the Forty-First Asilomar Conference on Signals, Systems and Computer* (Nov. 4, 2007) pp. 302-308.

Chunghwa Telecom Laboratories (CHTTL), Effect of Quantization Errors on the Achievable Throughpout of LTE MU-MIMO Schemes, 3GPP R1-062776, Seoul, Korea, Oct. 13, 2006.

Intel Corporation, "Scaleable Precoding and Implementation complexities", 3GPP R1-061126, Shanghai, China, May 12, 2006.

Japanese Office Action Corresponding to Japanese Patent Application No. 2011-534421; Mailing Date: Jan. 11, 2013; 4 pages. (Foreign Text Only).

Khaled N. et al., "Interpolation-Based Multi-Mode Precoding for MIMO-OFDM Systems with Limited Feedback", *IEEE Transactions on Wireless Communications*, Mar. 2007, vol. 6, No. 3, pp. 1003-1013.

Li Q. et al., "Precoder Quantization for MIMO-OFDM Systems over Frequency Selective Channels", *Mobile and Wireless Communications Summit*, 2007, 16$^{th}$ IST, Jul. 5, 2007.

Mondal B. et al., "Channel Adaptive Quantization for Limited Feedback MIMO Beamforming Systems", *IEEE Transactions on Signal Processing*, Dec. 2006, vol. 54, No, 12, pp. 4717-4729.

Roh J.C. et al., "Channe Feedback Quantization Methods for MISO and MIMO systems", *Personal, Indoor and Mobile Radio Communications, 2004. PIMRC 2004. 15$^{th}$ IEEE International Symposium on*, Sep. 8, 2004, vol. 2, pp. 805-809.

Roh J.C. et al., "Efficient Feedback Methods for MIMO Channels Based on Parameterization", *IEEE Transactions on Wireless Communications*, Jan. 2007, vol. 6, No. 1, pp. 282-292.

Saito Y. et al., "A Study on the Feedback Amount Reduction of Frequency Offset and Transmit Weight in a Virtual MIMO System", *IEICE Technical Report*, Aug. 20, 2008, vol. 108, No. 188, pp. 25-30.

\* cited by examiner

CHANNEL-ASSISTED ITERATIVE PRECODER SELECTION

CROSS REFERENCE TO RELATED APPLICATION

This application is a 35 U.S.C. §371 national stage application of PCT International Application No. PCT/SE2008/051241, filed on 31 Oct. 2008, the disclosure and content of which is incorporated by reference herein in its entirety. The above-referenced PCT International Application was published in the English language as International Publication No. WO 2010/050862 A1 on 6 May 2010.

TECHNICAL FIELD

The present invention generally concerns communications technology and more particularly so-called precoding for multi-antenna transmission in a mobile communications network and the issue of providing an appropriate quantized representation of a precoding matrix in an efficient manner.

BACKGROUND

It is well-known that the use of multiple antennas at the transmitter and/or the receiver can significantly boost the performance of a wireless system. Such multiple-input-multiple-output (MIMO) or Multiple Input Single Output (MISO) antenna configurations have the potential of both improving data rates as well as increasing the diversity.

Precoding is a popular multi-antenna technique for improving the performance of a multi-antenna system such as MIMO by transforming the information carrying transmit vector so that it better fits the channel conditions. This can be done based on instantaneous channel information or completely without channel information or some combination thereof. Often, precoding is implemented as performing a linear transformation on the information carrying vector prior to transmission. Such linear transformation is usually represented by a matrix. Precoding is an integral part of Long Term Evolution (LTE) as well of Wideband Code Division Multiple Access (WCDMA) systems.

In many wireless systems such as Frequency Division Duplex (FDD) systems, the transmitter will not have perfect channel information because the forward and reverse channels lack reciprocity. The transmission is on the forward channel, but the transmitter itself may only perform channel measurements on the reverse channel. If the forward and reverse channels do not have the same channel characteristics, the reverse channel measurements will hence not always be representative of the forward channel. For this reason the actual forward channel is most often measured at the receiver, and appropriate feedback information is then provided to the transmitter through a finite-rate feedback channel. Throughout the disclosure, the term receiver implies that the considered unit can receive, but it may, and usually does, have the ability to transmit information including feedback information. Likewise, the term transmitter implies that the considered unit can transmit, but it may have the ability to receive information including feedback information.

There are two basic flavors of precoding—codebook based and non-codebook based. Codebook based precoding normally means that the precoding matrix implementing the linear transformation is selected from a typically finite set of candidate matrices, where the mentioned set constitutes the codebook. Channel-dependent codebook based precoding can be seen as a form of channel quantization since typically a set of channel realizations map to a certain precoding matrix. The feedback signaling mentioned above for example can be viewed as a way for the receiver to provide channel information to the transmitter; so called closed-loop precoding. Non-codebook based precoding, on the other hand, does not involve any quantization; the precoding element can thus for example be a continuous function of the channel matrix.

In reference [1], which relates to limited feedback precoding for spatial multiplexing, the receiver selects the precoding matrix from a finite codebook and then conveys an indication of the selected matrix to the transmitter using a limited number of bits; so-called quantization of the precoding matrix. The approach defined in reference [1] is sometimes referred to as joint quantization or matrix quantization, where an optimal or desired precoding matrix is computed using knowledge about the channel, and then an exhaustive search among the candidate matrices available in the finite matrix codebook is performed to find the candidate matrix that is closest to the optimal one in terms of a distance measure.

Unfortunately, one of the practical issues with matrix quantization is the high computational complexity normally involved. The size of the matrix codebook increases with the number of antennas used for the multi-antenna transmission. For a receiver in the form of a user terminal such as an ordinary mobile phone or similar user equipment, the heavy computations will drain the battery and may also prevent real-time implementations. Therefore so-called matrix quantization is of limited use in practice.

Examples of lower-complexity quantization approaches can be found in the literature. In references [2, 3], for example, an iterative or recursive vector quantization (VQ) technique is proposed. First an optimal or desired precoding matrix is computed using channel knowledge, and then this matrix is parameterized and quantized recursively column by column. The output of each column is a unit vector, the size of which reduces by one after each iteration. The columns of the overall matrix are recursively quantized one by one using a corresponding set of column or vector codebooks. For each column of the matrix the quantization is based on determining which candidate vector in the considered codebook that is closest to the column to be quantized.

The substitution of matrix quantization for iterative vector quantization reduces the computational complexity significantly. However, the performance of the iterative vector quantization techniques proposed in the prior art may still not be sufficient for the continuously increasing demands for higher data rates and more reliable data transmissions in modern mobile communication networks.

SUMMARY

There is thus a general demand for improved techniques for providing a quantized representation of a precoding matrix to be used for multi-antenna transmission in mobile communication networks.

It is an object of the present invention to present a method for providing a quantized representation of a precoding matrix for a codebook-based precoder.

It is also an object to present a device for providing a quantized representation of a precoding matrix for a codebook-based precoder.

Yet another object of the invention is to provide a mobile communications network node, such as a user equipment terminal or a base station, implementing such a device for providing a quantized representation of a precoding matrix.

These and other objects are met by the invention as defined by the accompanying patent claims.

According to the invention, a channel matrix representing multi-antenna channel characteristics between a transmitter and a receiver in the mobile communications network is estimated. The transmitter generally has at least two antennas and the receiver has one or more antennas.

A basic idea of the invention is then to perform a channel-assisted iterative vector selection procedure for iteratively selecting precoding vectors for the precoding matrix.

Each of a number of iterations of the novel iterative vector selection procedure generally involves:
- evaluation of the performance of each one of a set of candidate vectors included in a given vector codebook with respect to a predetermined performance measure that is dependent on the estimated channel matrix; and
- selection of one of the set of candidate vectors as a respective precoding vector for the precoding matrix based on the evaluated performance.

Based on the channel-assisted iterative vector selection procedure, information representative of a set of selected precoding vectors is compiled to form a quantized representation of the precoding matrix for transmission to the transmitter side.

A precoding vector typically corresponds to a column of the overall precoding matrix. As those skilled in the art understands, any representation that is equivalent to such a column can of course be used. A precoding vector is generally a sub-set of the precoding matrix, and a plurality of precoding vectors is hence needed to build up the precoding matrix.

In a sense, each of the considered candidate vectors is mapped from a vector domain defined by the vector codebook onto a performance domain as a function of the channel-matrix dependent performance measure. Subsequently, a suitable candidate vector is selected among those candidate vectors in the vector domain having the highest performance in the performance domain.

In this way, it is possible to avoid the ordinary distance-based vector quantization in which candidate vectors are simply compared to a corresponding column of an "optimal" precoding matrix to find the candidate vector that is closest to the "optimal" column.

The invention also provides a device for providing a quantized representation of a precoding matrix for a codebook-based precoder based on an iterative vector selection procedure, as well as a network node for a mobile communications network, which network node includes such a device.

Other advantages offered by the invention will be appreciated when reading the below description of embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION

Figure 1:
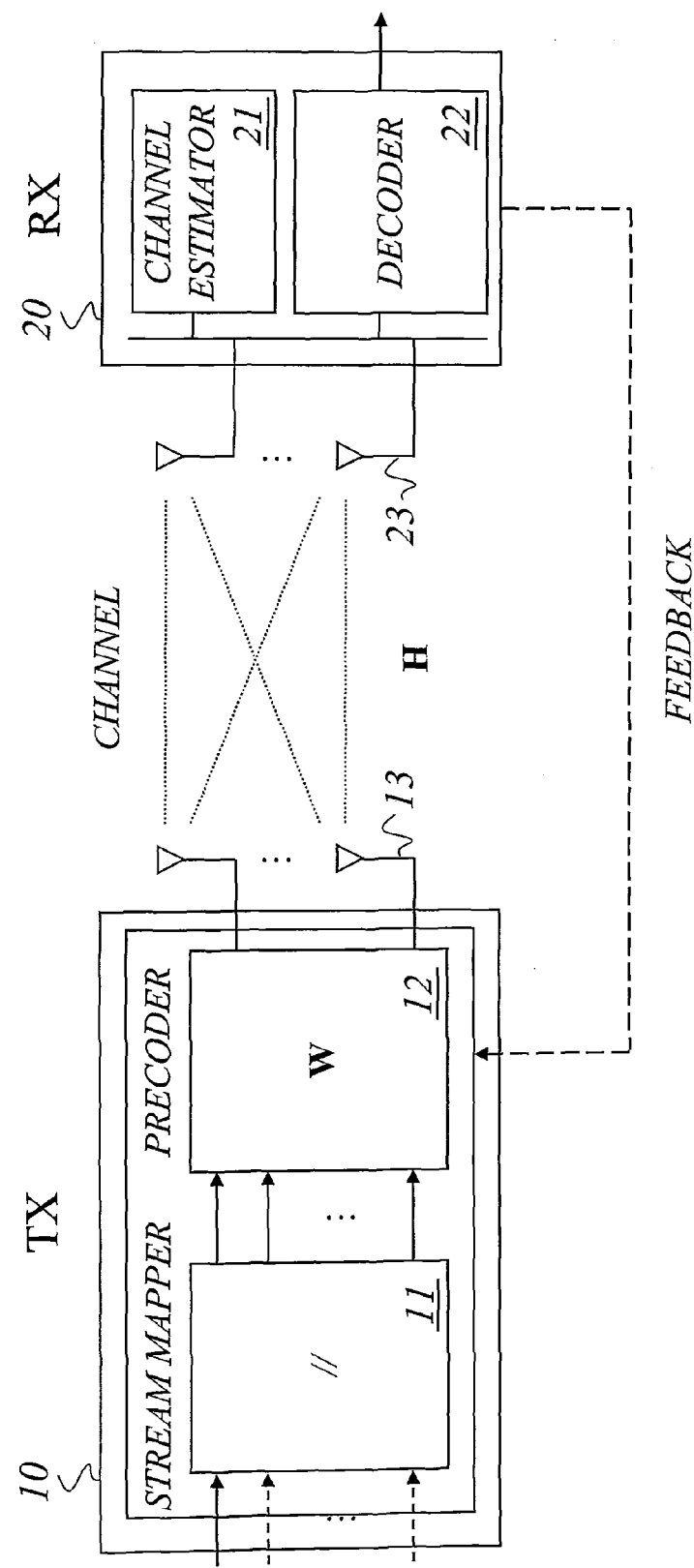
FIG. 1 is a schematic diagram illustrating precoding in the context of a transmitter and a receiver in a mobile communications network.

Throughout the drawings, the same reference characters will be used for corresponding or similar elements.

It may be useful to begin with a brief overview of the use of precoding for multi-antenna transmission in the context of a mobile communications network, referring to the schematic diagram of FIG. 1.

FIG. 1 is a schematic diagram illustrating precoding in the context of a transmitter and a receiver in a mobile communications network. The relevant parts of the transmitter (TX) 10 basically include a stream mapper 11, a precoder 12 and a number of antennas 13. The relevant parts of the receiver (RX) 20 basically include a channel estimator 21, a decoder 22 and a number of antennas 23. The transmitter includes at least two antennas 13 so as to provide for multi-antenna transmissions. The receiver includes at least one antenna 23.

The stream mapper 11 receives one or more modulated streams of information, possibly encoded by use of Forward Error Correction (FEC) code or similar, and maps them to spatial streams. An individual data stream may be mapped to all or at least many of the output spatial streams, but it is also possible to map individual input data streams to different spatial output streams. The precoder 12 receives the spatial streams from the stream mapper 11 and applies a precoding matrix W in order to transform the streams so that they better fit the channel conditions between the transmitter (TX) and the receiver (RX). Precoding is a popular multi-antenna technique for improving the performance of multi-antenna systems such as MIMO systems. As previously mentioned, precoding is for example an integral part of LTE as well of WCDMA systems.

As mentioned in the background section, the characteristics H of the multi-antenna channel between transmitter and receiver is typically measured at the receiver 20 by a channel estimator 21, and appropriate feedback information is provided to the transmitter 10 through a finite-rate feedback channel. The feedback information could be in the form of explicit channel state information (CSI) or a quantized representation of the desired precoding matrix. The feedback information is received by the transmitter, which may then select a suitable precoding matrix W using channel state information and/or the quantized precoding matrix representation.

The precoded streams of information are then transmitted by multiple antennas 13 of the transmitter 10 and received by one or more antennas 23 of the receiver 20. The received streams of information are then decoded in a decoder 22 in the receiver 20. The decoder thus implements functionality for performing an inverse precoding operation using knowledge of the selected precoding matrix, and possibly also includes functionality for inverse stream mapping to retrieve the modulated streams of information for further optional processing (not shown).

For a better understanding of the invention, we will continue with a relatively detailed review of the state of the art with respect to precoding.

In general, the purpose of precoding is to map r symbol streams (where r is referred to as the transmission rank) onto the $n_T$ transmit antennas ($n_T \geq r$), in such a way that the receiver can decouple the multiple symbol streams (i.e. filter out the inter-stream interference) and so that as much signal power as possible reaches the receiver. The performance of a precoder thus depends on the realization of the channel, described by the $n_R \times n_T$ complex-valued channel matrix H.

Matrix Quantization

It is a common approach to first compute the desired "optimal" precoder, $W_{opt}$, using real valued (floating point) operations, using the CSI (i.e. H) at hand, and next find the precoder (i.e. the precoding matrix) in a precoding matrix codebook that is closest to $W_{opt}$ in some distance measure. This is typically referred to as joint quantization or matrix quantization, and described for example in reference [1].

For an intuitive feeling of the relation between the precoder and link performance (i.e. the channel realization), the channel may be factored, using conventional singular value decomposition:

$$H = [U_f \ U_u] \begin{bmatrix} \Sigma_f & 0 \\ 0 & \Sigma_u \end{bmatrix} [V_f \ V_u]^H,$$

where the diagonal matrices $\Sigma_f$ and $\Sigma_u$ represent the favorable and unfavorable singular values, respectively; that is, $\Sigma_f$ contains the $r_f$ largest (non-zero) singular values, and $\Sigma_u$ the remaining singular values that are deemed too small to support data transmission. The number of favorable channel dimensions, $r_f$, sets an upper bound on the transmission rank:

$$r \leq r_f.$$

The orthogonal columns of $V_f$ thus form a basis for the favorable signaling space of the channel; that is, ideally the range of the desired optimal precoder, $W_{opt}$, should be a subset of the range of $V_f$.

In the most general case, there is no particular structure imposed on the precoders in the codebook; that is, each precoder in the codebook is assigned an index that uniquely identifies the precoder and precoders with different indices are not required to be related in any specified way. With no enforced structure, there is a great flexibility in the design of the codebook that can be designed to maximize the performance using, for example, Grassmanian matrix sub-space packing; that is, the precoders are selected to be as evenly spaced over the matrix space as possible.

Well designed unstructured codebooks thus have the advantage of good performance in terms of bit error rate (BER) and throughput of the communication system, but this benefit comes at the price of significant computational complexity in determining which precoder to recommend/use. Without structure, the performance must, in principle, be estimated for all precoders in the codebook. Such computations are acceptable for small codebooks, and systems with few transmit and receive antennas; however, they result in significant, or even intractable, computational complexity for large codebooks and systems with many transmit and receive antennas. Computational complexity considerations are the motivation for structured codebooks, and iterative precoder quantization.

Structured Iterative Quantization

Figure 2:
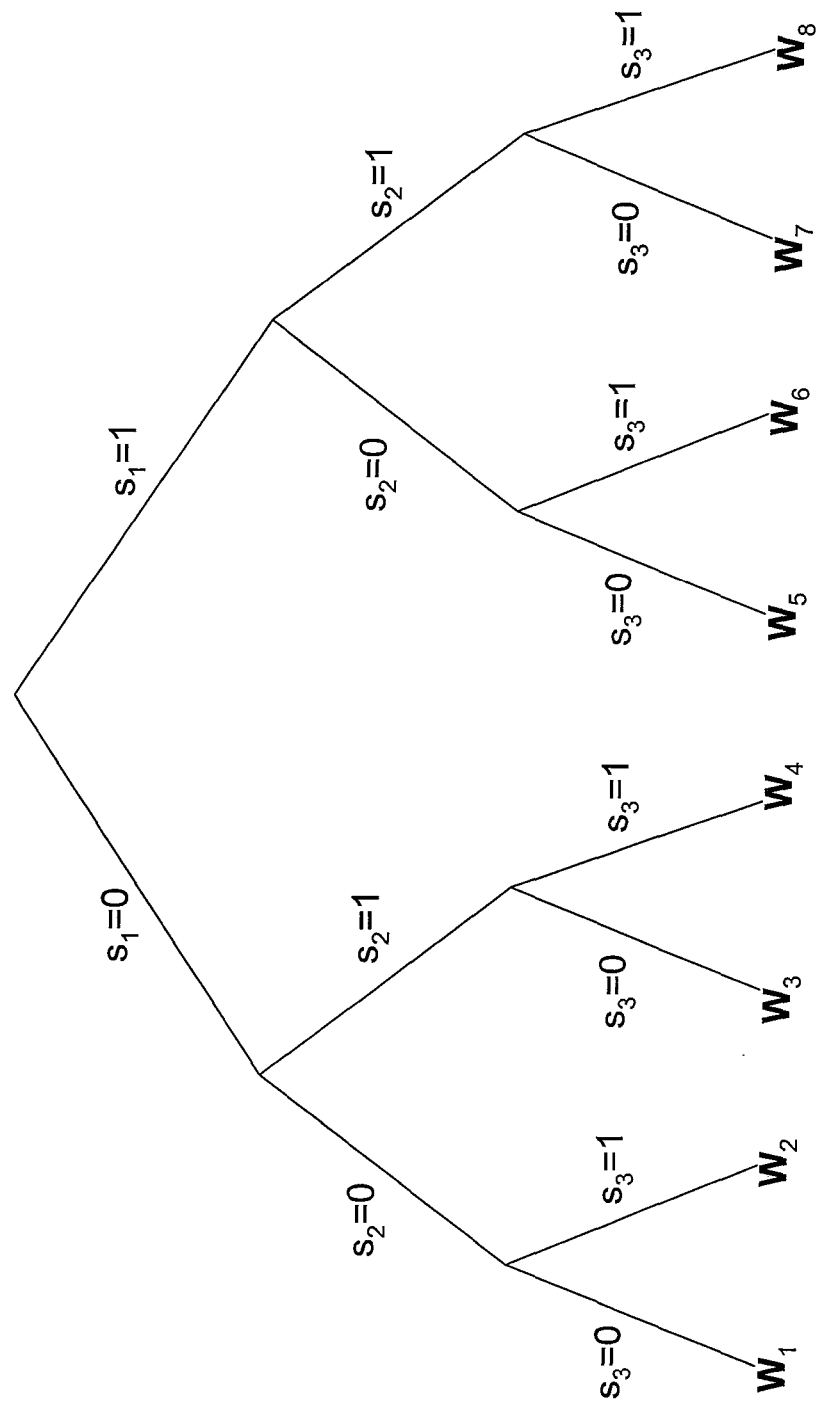
FIG. 2 illustrates a codebook of eight precoders that are indexed using three bits.

By imposing structure in the codebook it is possible to group precoders, such that whole groups of precoders can be discarded using a single mutual evaluation. For example, say that the codebook contains eight precoders, $\{W_1, \ldots, W_8\}$, that are indexed using three bits, $s_1 s_2 s_3$; as illustrated in FIG. 2.

If the codebook is further designed in a way such that it is possible to successively evaluate first whether $s_1$ is 0 or 1, and next $s_2$, and so on; then it is possible to eliminate whole branches of the tree in each iteration. In the example given in FIG. 2, the number of evaluations can be reduced this way from eight (one for each precoder) to three (one for each node).

In general the codebook can be structured using many branches at each node; that is, $s_k$ may not be binary but take on values in a set $\{0, 1, \ldots, n_k\}$, where $n_1$ may be different from $n_2$, and so on.

A straightforward way to implement a so-called iterative vector quantization (VQ) procedure is to consider each of r columns of a desired optimal precoder, $W_{opt}=[w_1, \ldots, w_r]$, separately. First, $w_1$ is quantized into $\hat{w}_1$ (represented by the index $s_1$) using a first vector codebook, CB; next $w_2$ is quantized into $\hat{w}_2$ (represented by the index $s_2$) using a (potentially different) codebook; next $w_3$ is quantized, and so on.

A refined approach takes advantage of $W_{opt}$ having orthonormal (mutually orthogonal and normalized) columns. It is well known that such complex valued matrices can be parameterized by complex valued vectors, $q_1, \ldots, q_r$, of decreasing dimensionality, as exemplified in references [2, 3]; that is, $q_1$ has $N_T$ entries; $q_2$ has is $N_T-1$ entries; and so on. The quantization procedure proposed in [2, 3] is an iterative approach where at each step an orthonormal matrix $W_{i-1}$ with dimensions $(N_T-i+1 \times r-i+1)$ is decomposed as:

$$W_{i-1} = [q_i P_i W_i],$$

where $q_i$ is a $(N_T-i+1 \times 1)$ unit-norm vector that represents the first column of $W_{i-1}$, $W_i$ is a residual matrix with reduced dimensionality $(N_T-i \times r-i)$, and $P_i$ is a $(N_T-i+1 \times N_T-i)$ orthonormal basis matrix. In practice, $P_i$ takes $W_i$ and projects it onto the $N_T-i+1$ dimensional subspace that is orthogonal to $q_i$. In summary:

$q_i$ is the first column of $W_{i-1}$.

$P_i$ has orthonormal columns that span the orthogonal complement of $q_i$; that is, $P_i$ is a function of $q_i$, $P_i=P_i(q_i)$.

$W_1$, is the residual matrix that can be obtained as $[w_{dummy}, W_i] = P_i^H W_{i-1}$, where $w_{dummy}$ is a dummy vector.

The iterative procedure is initialized with $W_0 = W_{opt}$, from which $q_1$ and $P_1$ are computed. In the next iteration the procedure is repeated on the residual matrix, $W_1$, from which $q_2$ and $P_2$ are obtained; and so on. In total, the procedure is repeated $r-1$ times to obtain the $r-1$ parameter vectors $q_1, \ldots, q_{r-1}$. It should be noted that after the last iteration the residual matrix $W_r \equiv q_r$ becomes a $N_T-r+1 \times 1$ vector. Each of the r vectors, $q_1, \ldots, q_r$, represents the corresponding column of $W_0 = W_{opt}$; that is, the i:th column of $W_0 = W_{opt}$, $w_i$, is given by $$w_i = w_i(q_i) = P_1 P_2 \ldots P_{i-1} q_i.$$

The reason for representing $w_i$ by $q_i$ is to utilize the reduced dimensionality provided by the structure that $w_i$ is orthogonal to $w_k$, $k < i$.

In a practical VQ scheme, the complex vectors $q_i$ need to be represented with quantized vectors $\hat{q}_i$; therefore in the state of the art VQ schemes [2, 3] each vector $q_i$ is quantized as:

$$\hat{q}_i = \operatorname*{argmax}_{\hat{q}_i \in CB_i} |\hat{q}_i^H q_i|,$$

where $CB_i$ is a codebook of unitary vectors. This corresponds to selecting a vector from the codebook that is closest to the desired vector $q_i$. Note that this is equivalent to selecting the precoding vector, $\check{w}_i$, that is closest to $w_i$ from the codebook of candidate precoding vectors, $CB_i^{candidates}$:

$$\hat{w}_i = \operatorname*{argmax}_{\hat{w}_i \in CB_i^{candidates}} |\hat{w}_i^H w_i|,$$

where $CB_i^{candidates}$ is generated from $CB_i$ as:

$$CB_i^{candidates} = \{w_i(q_i)\}_{q_i \in CB_i}.$$

The structure of the mapping, $w_i = w_i(q_i) = P_1 P_2 \ldots P_{i-1} q_i$, ensures that each of the vectors in $CB_i^{candidates}$ is orthogonal to the columns (precoding vectors) selected in the preceding iterations.

It has to be stressed that each basis matrix $P_i$ is a function of just $q_i$, therefore only the set of vectors $\{\hat{q}_i\}$ needs to be fed back. Note that the transmitter side receiving the quantized vectors is generally unable to compute the original basis matrices $P_i = P_i(q_i)$ that formed the original parameterization of $W_{opt}$, because the un-quantized vectors are unavailable. A straightforward solution is to evaluate the basis matrices using the quantized vectors $P_i = P_i(\hat{q}_i)$ at both sides, which will synchronize the transmitter and the receiver, but quantization errors will propagate throughout the iterations.

Various algorithms exist for the evaluation of $P_i$ based on $q_i$ (or $\hat{q}_i$), i.e., for the evaluation of the basis matrix that spans the subspace orthogonal to $q_i$. As an example, the SVD (singular value decomposition) method may be applied:

$$\begin{bmatrix} q_i & P_i \\ N_T - n \times 1 & N_T - n \times N_T - n - 1 \end{bmatrix} = SVD \begin{pmatrix} q_i \\ N_T - n \times 1 \end{pmatrix},$$

where $SVD(\bullet)$ returns the left eigenspace of the singular value decomposition of $q_i$. However, in a practical implementation, $P_i$ may be evaluated by computationally cheaper algorithms based, e.g., on the Householder transformation as described in references [2, 3].

The restoration of the precoder from the quantized representation thereof is almost symmetrical to the quantization. The restoration unit retrieves the set of quantized vectors $\{\hat{q}_i\}$ from the feedback message, evaluates the basis matrices $\{P_i\}$ by employing some known algorithms (e.g., Householder transformation or SVD) and finally returns the quantized precoder as:

$$\tilde{W}_{opt} = [\hat{q}_1, P_1[\hat{q}_2, P_2[\ldots [\hat{q}_r, P_{r-1} \hat{q}_r,]]]],$$

or equivalently, the ith column of $\tilde{W}_{opt}$, $\hat{w}_i$ is restored as:

$$\hat{w}_i(\hat{q}_i) = P_1 P_2 \ldots P_{i-1} \hat{q}_i.$$

It can be noted that the same quantization-restoration concept may be parameterized in various (mathematically equivalent) ways in the referenced literature [2, 3].

For completeness, an example of iterative vector quantization of a precoding matrix according to the prior art will be described below:

Take for example a system with $N_T = 4$ transmit antennas and a transmission rank $r = 3$. In other words, $W_{opt}$ is a matrix with 4 rows and 3 columns. The quantization would then proceed as follows:

1. Compute a desired optimal precoding matrix $W_{opt}$ by using the estimated channel matrix H.
2. The conventional iterative vector quantization algorithm is initialized by setting $W_0 = W_{opt}$.
3. The first column of $W_0 = W_{opt}$ is quantized using $CB_1$ into a 4 element vector $\hat{q}_1$.
4. The 4 by 3 basis matrix, $P_1$, is computed using $\hat{q}_1$
5. The 3 by 2 residual matrix $W_1$ is computed from the relation $[w_{dummy}, W_1] = P_1^H W_0$
6. The first column of $W_1$ (corresponding to the second column of $W_{opt}$) is quantized using $CB_2$ into a 3 element vector $\hat{q}_2$.
7. The 3 by 2 basis matrix, $P_2$, is computed using $\hat{q}_2$
8. The 2 by 1 residual matrix (vector) $W_2$ is computed from the relation $[w_{dummy}, W_2] = P_2^H W_1$
9. Finally the vector $W_2$ is quantized using $CB_3$ into a 2 element vector $\hat{q}_3$.

The precoder $W_{opt}$ is thus represented by the three quantized vectors $\hat{q}_1$, $\hat{q}_2$, and $\hat{q}_3$.

The precoder, $\tilde{W}_{opt}$, is obtained from the three vectors as follows:

1. The first column of $\tilde{W}_{opt}$ is given by $\hat{q}_1$
2. The second column of $\tilde{W}_{opt}$ is given by $P_1 \hat{q}_2$, where $P_1$ is obtained from $\hat{q}_1$
3. Finally, the third column of $\tilde{W}_{opt}$ is given by $P_1 P_2 \hat{q}_3$, where $P_2$ is obtained from $\hat{q}_2$.

The inventors have realized that the current state of the art in iterative vector quantization is limited in the sense that it only considers the deviation in distance (i.e. the quantization error) between the "optimal column" and the quantized version on a column-by-column basis without considering the overall objective of the precoding matrix.

A thorough analysis by the inventors reveals that from a performance perspective it may for example be more interesting to ensure that the quantized precoder has as similar range as the optimal precoder as possible (i.e. to ensure that their columns span as similar subspaces as possible). This is particularly the case in systems that do not n use power loading on the different parallel data streams. Hence, a quantization error of a precoder column is not necessarily unfavorable; as long as it remains in the range of the optimal precoder (or rather not in the null space of the channel) the system performance may not be affected. On the other hand, if the quantization error is unfavorable and falls outside the range, then there will be a performance loss. In particular, in heavily quantized codebooks, where there are significant quantization errors, only evaluating the performance on a column by column basis, may therefore result in a significant, and unnecessary, performance loss. In case of optimal maximum-likelihood (ML) receivers, the performance is fully determined by the subspace spanned by the (column orthonormal) precoder, but also for suboptimal minimum mean square error (MMSE) receivers there is a performance gain if a precoding subspace, rather than, a precoder matrix is quantized.

In general, a basic idea of the invention is to avoid the predominant trend in the prior art of computing an optimal precoding matrix $W_{opt}$ and iteratively quantizing the columns of this matrix by finding, for each column, the candidate vector that is closest to the respective column.

In clear contrast to the prior art, the invention proposes a novel channel-assisted iterative vector selection procedure for iteratively selecting so-called precoding vectors to build up a precoding matrix. In each of a number of iterations of the iterative vector selection procedure, the performance of each one of a set of candidate vectors included in a given vector codebook is evaluated with respect to a predetermined performance measure that is dependent on the channel matrix, and one of candidate vectors is then selected for representing a column or so-called precoding vector of the precoding matrix based on the evaluated performance.

A precoding vector typically corresponds to a column of the overall precoding matrix. As those skilled in the art understands, any representation that is equivalent to such a column can of course be used. A precoding vector is thus a sub-set of the precoding matrix, and a plurality of precoding vectors are needed to build up the precoding matrix.

Figure 3:
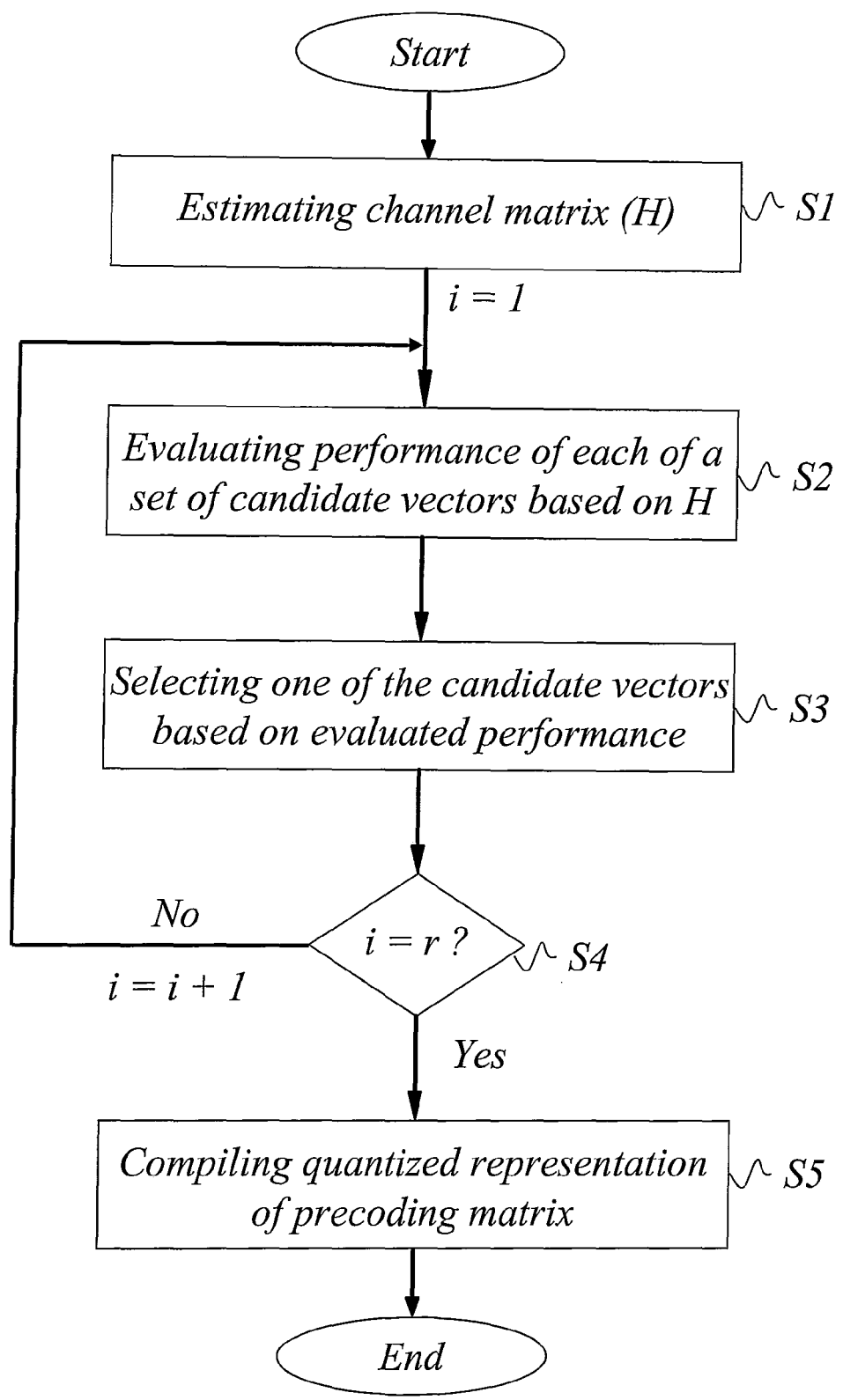
FIG. 3 is a schematic flow diagram of a method for providing a quantized representation of a precoding matrix for a codebook-based precoder according to a preferred exemplary embodiment of the invention.

For an overview of an exemplary embodiment of the invention, reference is made to the schematic and illustrative flow diagram of FIG. 3.

In step S1, a channel matrix H representing multi-antenna channel characteristics between a transmitter and a receiver in the mobile communications network is estimated. The transmitter generally has at least two antennas and the receiver has one or more antennas. Next an iterative vector selection procedure is initiated (i=1). In step S2, the performance of each of a number of candidate vectors from a given vector codebook is evaluated based on the estimated channel matrix H. In particular, a predetermined performance measure that is dependent on the channel matrix is evaluated for each of the candidate vectors. In step S3 one of the candidate vectors is selected as a respective precoding vector for the precoding matrix based on the evaluated performance. Preferably, the vector is selected among those candidate vectors having the highest or best performance. In step S4, it is investigated whether all iterations have been completed, i.e. whether all the r precoding vectors (corresponding to columns) of the precoding matrix have been defined. If not (No), the next iteration is started (i=i+1) and the steps S2-S4 are repeated. If all iterations have been completed (Yes), information representative of a set of selected precoding vectors are compiled to form a quantized representation of the precoding matrix for transmission to the transmitter side.

The channel estimation, the iterative vector selection procedure and the compilation are typically performed by the receiver, and the receiver is normally also responsible for transmitting the quantized representation of the precoding matrix to the transmitter. This will enable the transmitter to restore the precoding matrix from the quantized representation and perform precoding and subsequent multi-antenna transmission adapted to the channel conditions.

The channel matrix may for example be related to an individual sub-carrier such as an OFDM (Orthogonal Frequency Division Multiplex) narrow-band sub-carrier, or optionally related to a set of sub-carriers.

Figure 4A:
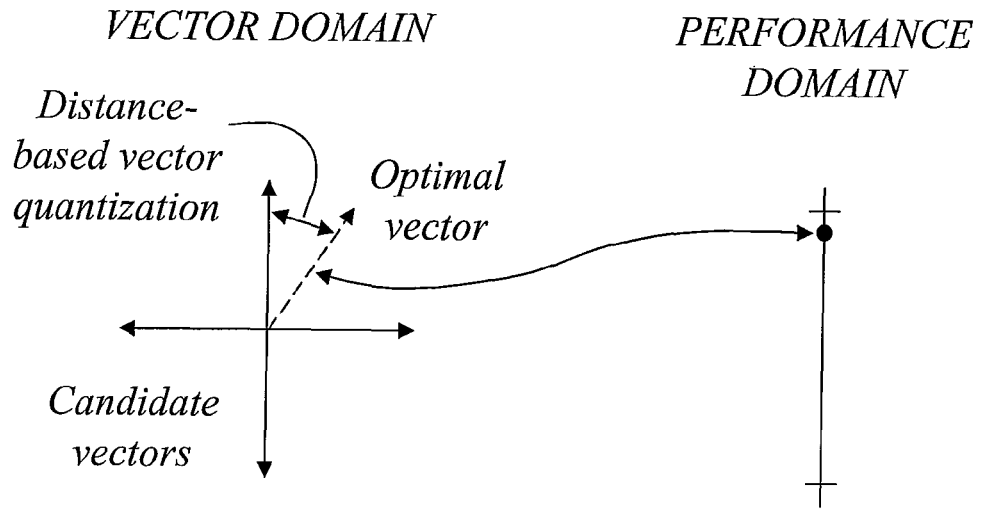
FIG. 4A illustrates a one-to-one mapping between an optimal vector and a performance measure in the performance domain, and distance-based vector quantization of the optimal vector based on comparison with a limited number of candidate vectors according to the prior art.

As illustrated in FIG. 4A, the predominant trend in the prior art is to first compute a desired optimal precoding matrix and then attempt to find, column-by-column, the vector from a given vector codebook that is closest to the corresponding "optimal" column to be quantized. This means that each of the considered candidate vectors is compared to the so-called optimal vector, and a distance-based vector quantization is performed to find the candidate vector that is most closely aligned to the optimal vector. It turns out that this common prior art approach does not always provide the best overall performance.

Figure 4B:
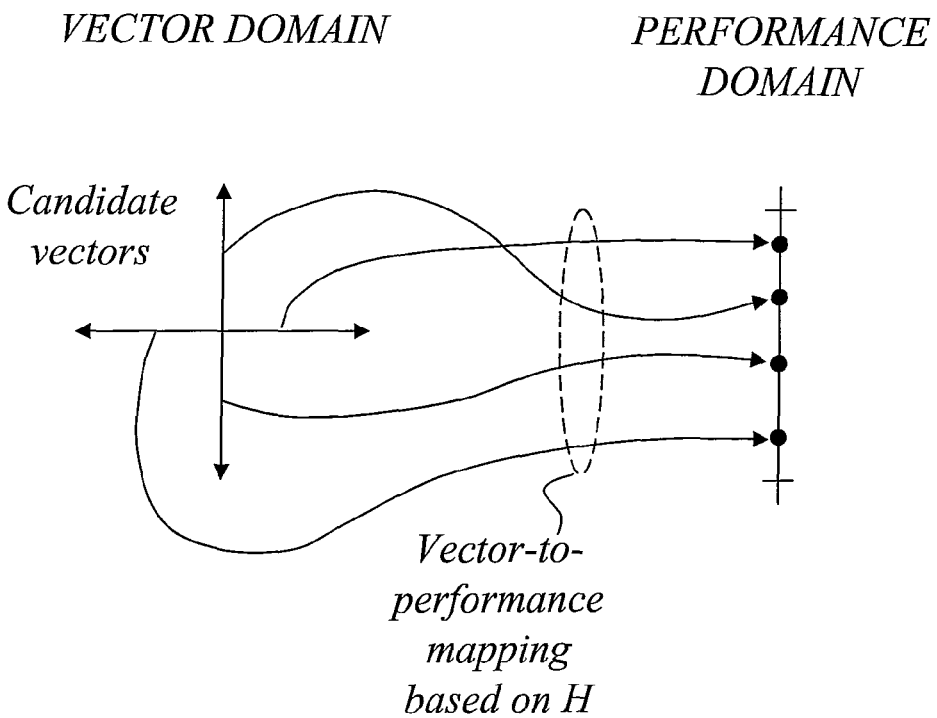
FIG. 4B illustrates a simplified example of how each of a number of candidate vectors is mapped from the vector domain to the performance domain based an estimate of the channel according to an exemplary embodiment of the invention.

In accordance with the present invention, it is proposed to evaluate, at each of a number of iterations (each iteration corresponding to a respective column), the performance of each one of a set of candidate vectors with respect to a predetermined performance measure that is dependent on the estimated channel matrix. In a sense, each of the considered candidate vectors is mapped from a vector domain defined by the vector codebook onto a performance domain as a function of the channel-matrix dependent performance measure, as illustrated in FIG. 4B. Subsequently, a suitable candidate vector is selected among those candidate vectors in the vector domain having the highest performance in the performance domain.

In the prior art approach illustrated in FIG. 4A, there is simply a one-to-one mapping between the "optimal" vector and performance. The candidate vectors are only compared distance-wise to the optimal vector. With the invention the optimal precoding matrix does not even have to be known beforehand. The iterative vector selection procedure proposed by the invention is based on mapping each of the considered candidate vectors to the performance domain and rather aims at building up the desired precoding matrix from the performance evaluation.

Instead of following the predominant trend in the prior art and first compute a desired precoding matrix and then attempt to find, column-by-column, the vector from a given vector codebook that is closest to the corresponding column to be quantized, the idea of the present invention is thus to evaluate, at each of a number of iterations (each iteration corresponding to a respective column in the precoding matrix), the performance of each one of a set of candidate vectors with respect to a predetermined performance measure that is dependent on the estimated channel matrix.

The iterative vector selection procedure is therefore normally not used for quantizing an estimated optimal precoding matrix. In an exemplary embodiment of the invention, each iteration of the iterative vector selection procedure is non-comparative, without any reference to an estimated optimal precoding matrix or part thereof.

It should be understood that different vector codebooks can and often will be used in different iterations of the iterative vector selection procedure, as will be explained in more detail later on.

Any of a number of different performance measures may be used depending on the particular objective of the transmission and/or overall application. Normally, the performance measure is related to the rate of information that can be reliably transmitted over the wireless link between the transmitter and the receiver. This is sometimes referred to as throughput. A specific example of a performance measure is one based on a matrix product of a weighting matrix and the considered candidate vector, where the weighting matrix is dependent on the estimated channel matrix. The weighting matrix may be the channel matrix, or alternatively it may be a selected sub-space of the channel matrix such as the so-called favorable sub-space (as previously defined). Another specific example of a performance measure is one based on link capacity. Detailed information on different examples of performance measures will be described later on.

The invention defines a novel channel-assisted iterative vector selection procedure for a precoding matrix.

The prior art proposes a vector quantization scheme that is based on direct and distance-based quantization of the columns $w_i$:

$$\hat{w}_i = \underset{\hat{w}_i \in CB_i^{candidates}}{\operatorname{argmax}} |\hat{w}_i^H w_i|,$$

or equivalently, the corresponding $q_i$:

$$\hat{q}_i = \underset{\hat{q}_i \in CB_i}{\operatorname{argmax}} |\hat{q}_i^H q_i|.$$

On the other hand, the proposed scheme "quantizes" or rather selects $w_i$ through a performance evaluation in which the estimated channel matrix H is explicitly taken into account:

performance$_i = g(w_i, H)$, or more generally:
performance$_i = g_i(w_i, H)$, where g is a predetermined performance measure or metric, which may vary from iteration to iteration; $g_i$.

In each iteration, i, the candidate precoding vector, $\hat{w}_i$, belonging to the codebook of candidate precoding vectors, $CB_i^{candidates}$, that maximizes the predetermined performance measure, is selected. In the general case, the candidate codebook can be chosen/generated using any predetermined algorithms of choice (known to both receiver and transmitter). Preferably, it is to be ensured that all the precoding vector columns resulting from the iterative vector selection procedure are mutually orthogonal, or even orthonormal, with respect to each other. In practice, this means that in the next iteration the search among candidate vectors is restricted to those candidate vectors that are orthogonal in relation to the precoding vector(s) or column(s) selected in the previous iteration(s). Hence, in the following examples, the assumption of orthogonal columns in the precoding matrix is made, and it is convenient to represent $\hat{w}_i$ in terms of $\hat{q}_i$ as $\hat{w}_i(\hat{q}_i) = P_1 P_2 \ldots P_{i-1}\hat{q}_i$, as already shown. Further, let $g_i(q_i, H) = g_i(w_i(q_i), H)$ be the performance metric expressed in $q_i$.

Figure 5:
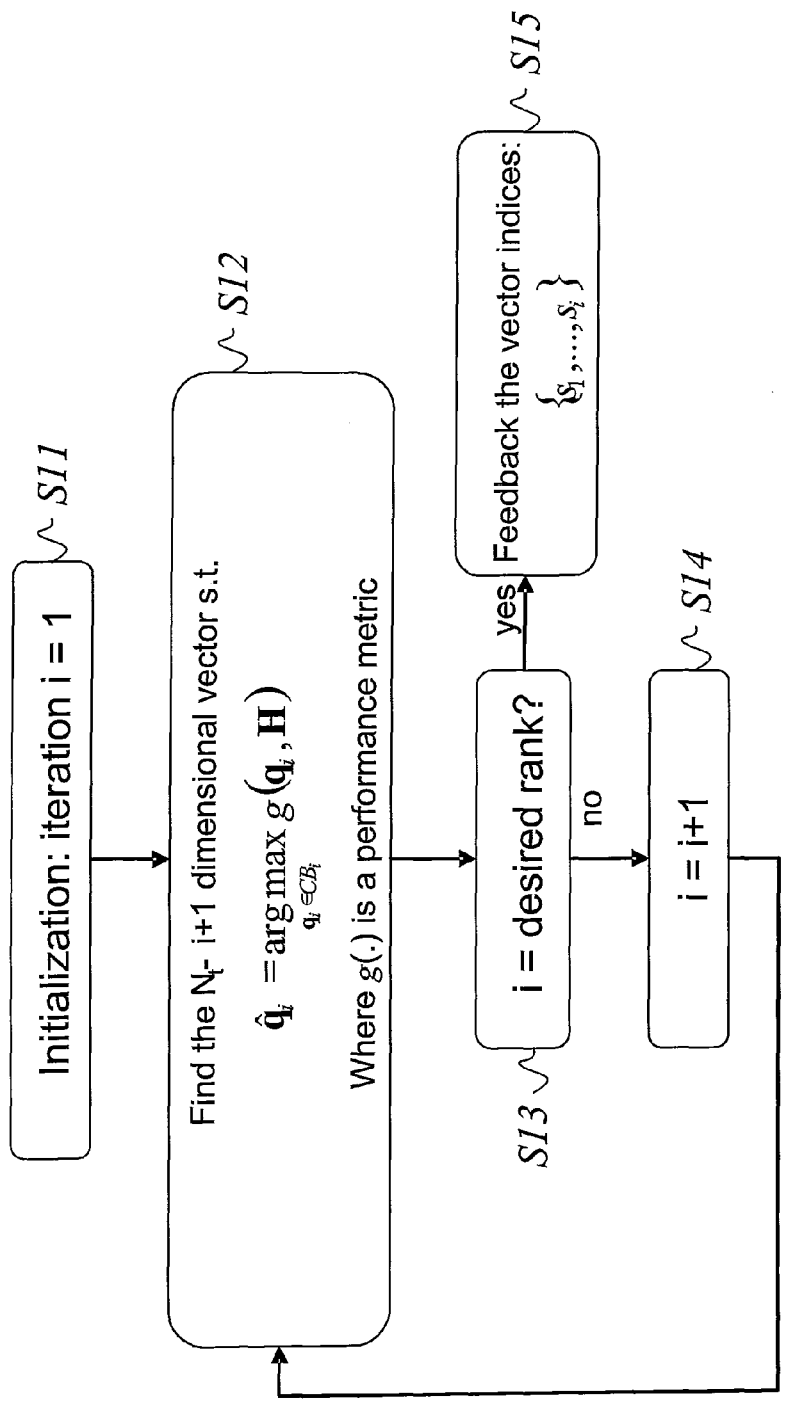
FIG. 5 is a flow diagram of a specific example of an iterative vector selection procedure according to a preferred exemplary embodiment of the invention.

FIG. 5 is a flow diagram of a specific example of an iterative vector selection procedure according to a preferred exemplary embodiment of the invention. In step S11, the iterative procedure is initialized by setting the iteration index i=1. In the next step S12, each of a number of candidate vectors $q_i$ in a vector codebook $CB_i$ is evaluated (in each iteration i) with respect to the performance measure. More precisely, in this example, this corresponds to finding a $(N_T-i+1)$ dimensional vector such that:

$$\hat{q}_i = \underset{q_i \in CB_i}{\operatorname{argmax}} g(q_i, H),$$

which is equivalent to finding the candidate precoding vector, $$\hat{w}_i = \underset{w_i \in CB_i^{candidates}}{\operatorname{argmax}} g(w_i, H).$$

In other words, the candidate vector which yields the highest (max) value of the performance measure g is selected. In step S13 it is decided whether the present iteration is the last iteration, i.e. if i corresponds to the desired rank. If not (no), the next iteration (i=i+1) is started in step S14 and the steps S12-13 are repeated once again. In the next iteration, the dimensionality of the candidate vectors and hence the selected column is reduced by 1.

When the last iteration has been completed (yes in step S13), the vector indices $\{s_1, \ldots, s_r\}$ of the selected precoding vectors or columns are compiled and feedback to the transmitter side in step S15.

A more detailed example of how to provide a quantized representation of a precoding matrix will now be given:

Take for example a system with $N_T=4$ transmit antennas and a transmission rank r=3; i.e. W is a matrix with 4 rows and 3 columns. The quantization or rather iterative vector selection would then proceed as follows:

1. The first column of the precoder is selected using $CB_1$ and the performance metric $g_1(H, q_1)$ as:

$$\hat{q}_1 = \underset{q_1 \in CB_1}{\operatorname{argmax}} \{g_1(H, q_1)\}$$

into a 4 element vector $\hat{q}_1$.

2. The 4 by 3 basis matrix, $P_1$, is computed using $\hat{q}_1$.

3. The second column of the precoder is selected using $CB_2$ and the performance metric as:

$$\hat{q}_2 = \underset{q_2 \in CB_2}{\operatorname{argmax}} \{g_2(H, q_2)\}$$

into a 3 element vector $\hat{q}_2$. Note that $g_2(H, q_2)$ also depends on $P_1$ and $\hat{q}_1$, even though it is not explicitly stated.

4. The third and last column of the precoder is selected using $CB_3$ and the performance metric $g_3(H, q_3)$ as:

$$\hat{q}_3 = \underset{q_3 \in CB_3}{\operatorname{argmax}} \{g_3(H, q_3)\}$$

into a 2 element vector $\hat{q}_3$. Note that $g_3(H, q_3)$ also depends on a $P_1$, $\hat{q}_1$, $P_2$, and $\hat{q}_2$, even though it is not explicitly stated.

The precoder is thus represented by the three quantized vectors $\hat{q}_1$, $\hat{q}_2$, and $\hat{q}_3$.

Preferably, the vector selection procedure of the present invention first selects the vector (or direction) in the codebook that gives the largest contribution to the performance measure, and uses this vector to represent the first column $\hat{q}_1$. In each next iteration i, the vector among the remaining vectors (that are orthogonal to the previously selected vector(s)) that gives the largest contribution to the performance measure is selected, and used for representing the next column $\hat{q}_i$.

The precoder, $\tilde{W}$, can be obtained (restored) from the three vectors as follows:

1. The first column of $\tilde{W}$ is given by $\hat{q}_1$.
2. The second column of $\tilde{W}$ is given by $P_1 \hat{q}_2$, where $P_1$ is obtained from $\hat{q}_1$.
3. Finally, the third column of $\tilde{W}$ is given by $P_1 P_2 \hat{q}_3$, where $P_2$ is obtained from $\hat{q}_2$.

$P_1$ and $P_2$, and more generally $P_i$, correspond to basis matrices defined in analogy with the iterative VQ schemes of the prior art previously described.

As previously mentioned, the performance measure g is typically related to the rate of information that can be reliably transmitted over the wireless link between the transmitter and the receiver, although any suitable performance measure or metric may be used depending on the particular objective and/or application. In the following, a few specific examples of performance measures or metrics will be given:

1. Channel capacity:

$$g_i(H,q_i) = \log_2 \det(I + H w_i(q_i) w_i(q_i)^H H^H),$$

where $w_i(q_i) = P_1 P_2 \ldots P_{i-1} q_i$.

2. Projection of $w_i(q_1)$ on H: $g_i(H, q_1) = \|H w_i(q_i)\|$.
3. Projection of $w_i(q_i)$ on the right favorable subspace of H:

$$g_i(H,q_i) = \|V_f^H w_i(q_i)\|.$$

Note that in the ith iteration, $\hat{q}_1, \ldots, \hat{q}_{i-1}$, are regarded as constant parameters of which $g_i(H, q_i)$ very well may depend on.

The examples 2 and 3 correspond to a performance measure that is based on a matrix product of a weighting matrix and the considered candidate vector, where the weighting matrix can be the channel matrix (example 2) or a selected sub-space of the channel matrix such as the favorable subspace (example 3).

Figure 6:
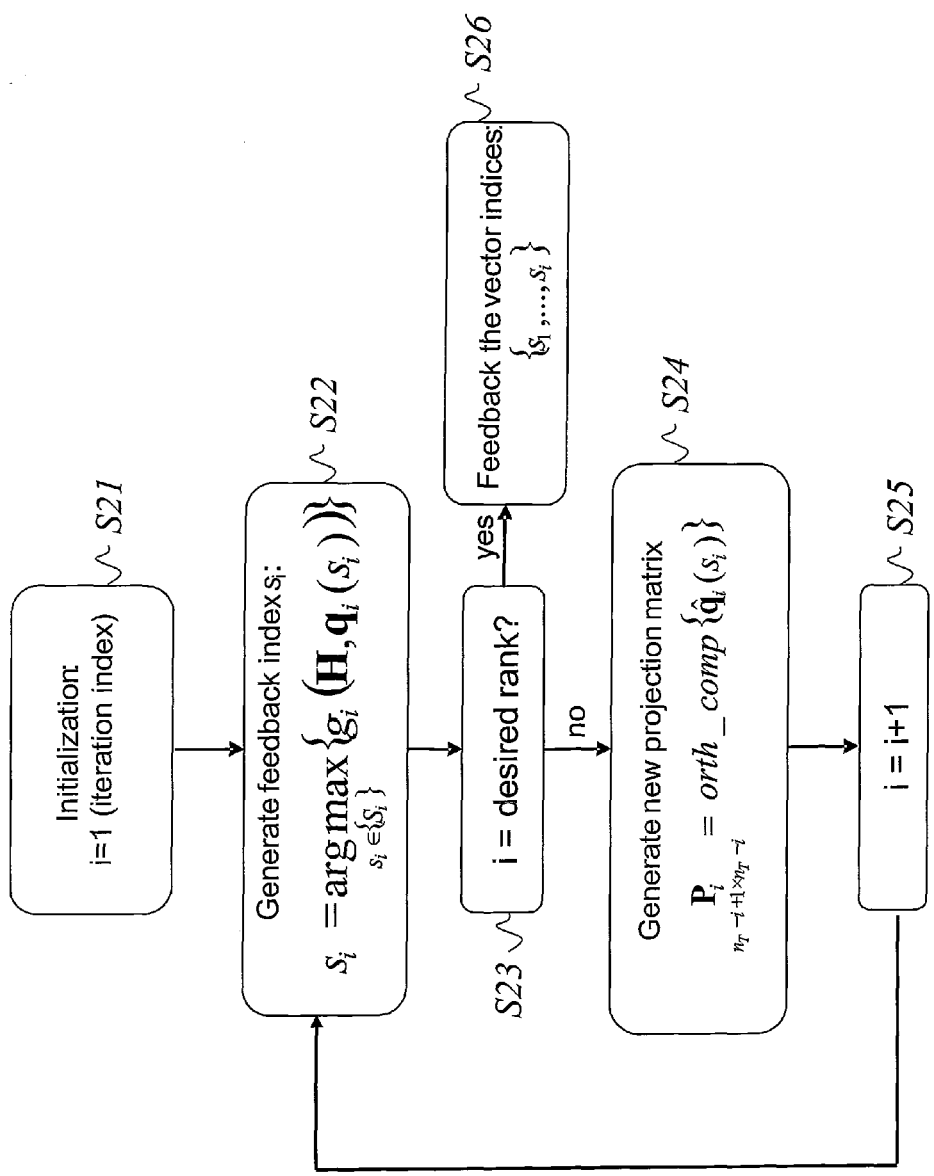
FIG. 6 is a flow diagram of another specific example of an iterative vector selection procedure according to a preferred exemplary embodiment of the invention.

FIG. 6 is a flow diagram of another specific example of an iterative vector selection procedure according to a preferred exemplary embodiment of the invention. In step S21, the iterative procedure is initialized by setting the iteration index i=1. As an alternative representation in the search for appropriate precoding vectors or columns, the vector indices or feedback indices $s_i$ are used to represent the selected precoding vector or column, as can be seen in step S22:

$$s_i = \underset{s_i \in S_i}{\operatorname{argmax}} g_i(H, q_i(s_i))$$

Each of a number of candidate vectors $q_i$, indexed by respective vector indices $s_i$ in a set $S_i$ of indices that correspond to a vector codebook, is evaluated (in each iteration i) with respect to the performance measure $g_i$. The vector index $s_i$ that is associated with the candidate vector $q_i$ which yields the highest (max) value of the performance measure $g_1$ is selected. In step S23 it is decided whether the present iteration is the last iteration, i.e. if i corresponds to the desired rank. If not (no), a new projection matrix, also referred to as a basis matrix, $P_i$, is generated in step S24, and the next iteration (i=i+1) is started in step S25 so that steps S22-23 are repeated once again. The function orth_comp used in step S24 defines the orthogonal complement of the given vectors and the output is an orthonormal basis matrix whose columns span the orthogonal complement. When the last iteration has been completed (yes in step S23), the vector indices $\{s_1, \ldots s_r\}$ are compiled and feedback to the transmitter side in step S26.

Figure 7:
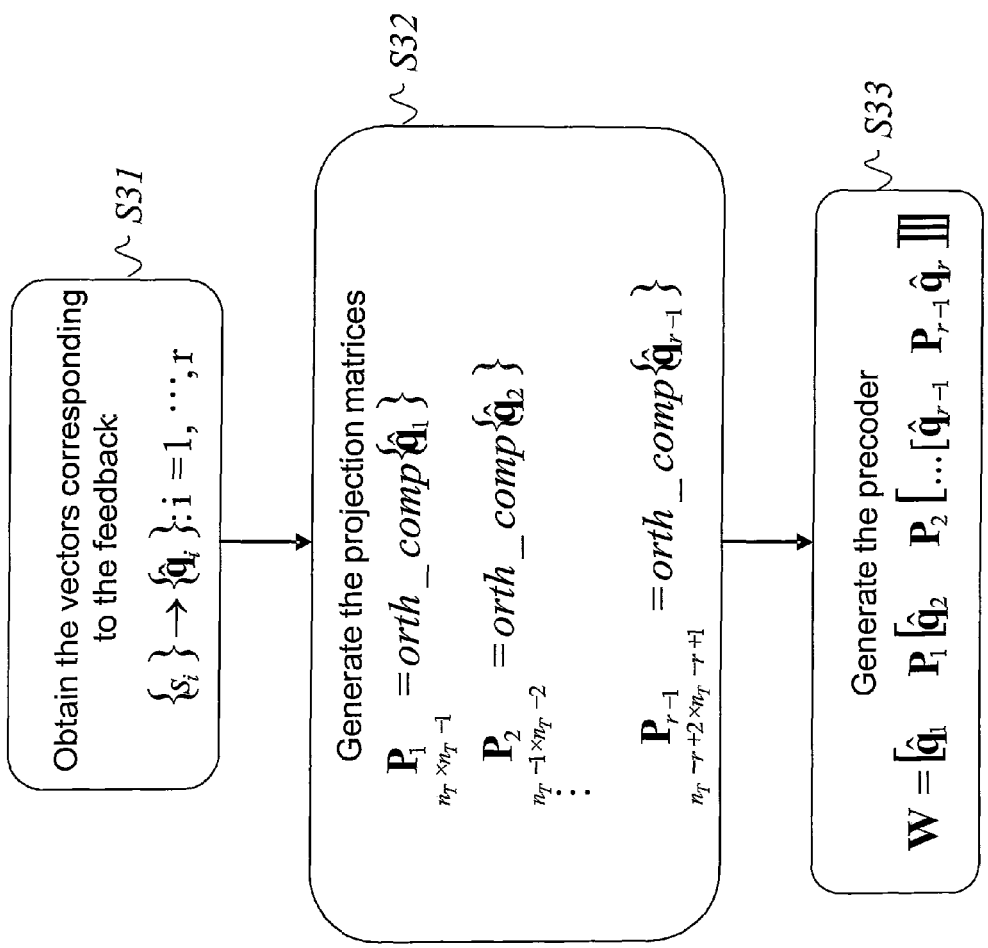
FIG. 7 is a schematic flow diagram illustrating an example of how to generate a precoding matrix from a quantized representation of such a matrix according to an exemplary embodiment of the invention.

FIG. 7 is a schematic flow diagram illustrating an example of how to generate or restore a precoding matrix from a quantized representation of such a matrix according to an exemplary embodiment of the invention. In step S31, the precoding vectors or columns $\hat{q}_i$ corresponding to the received feedback indices $s_i$ are extracted from a corresponding codebook maintained at the transmitter side. Next, in step S32, the required projection or basis matrices $P_1, \ldots, P_{r-1}$ are generated using the orth_comp function. Finally, the precoding matrix W is generated or restored at the transmitter side in step S33, using the extracted columns and the generated basis matrices.

The basis matrices $P_i$ project the quantized $(N_t-i \times 1)$ subspace onto the $N_t-i+1$ dimensional subspace which is orthogonal to $q_i$ (or $\hat{q}_i$). Implementation-wise, there are two alternatives for the evaluation of the $P_i$ matrices:

In case of strict memory limits, the matrices $P_i$ may be computed real-time by, e.g., use of a modified Householder transformation. This procedure requires only matrix multiplications.

In case of shortage of available processing power, the matrices $P_i$ may be stored in off-line codebooks. This is possible because the finite number of possible values for $P_i$ is limited by the cardinality of the codebooks CBi.

The computational complexity of the proposed approach matches the complexity of other VQ schemes and compares favorably with respect to brute force (exhaustive) matrix quantization schemes [1].

Restoring the quantized precoder from the vector indices that are fed-back requires limited computational effort and is accomplished with techniques equivalent to those described and taught in the state of the art [2, 3].

Numerical simulations show that the proposed scheme improves the performance (in terms of capacity) compared to state of the art VQ quantization schemes.

In the following we compare the performance of state of the art feedback schemes against specific examples of the invention.

Figure 8:
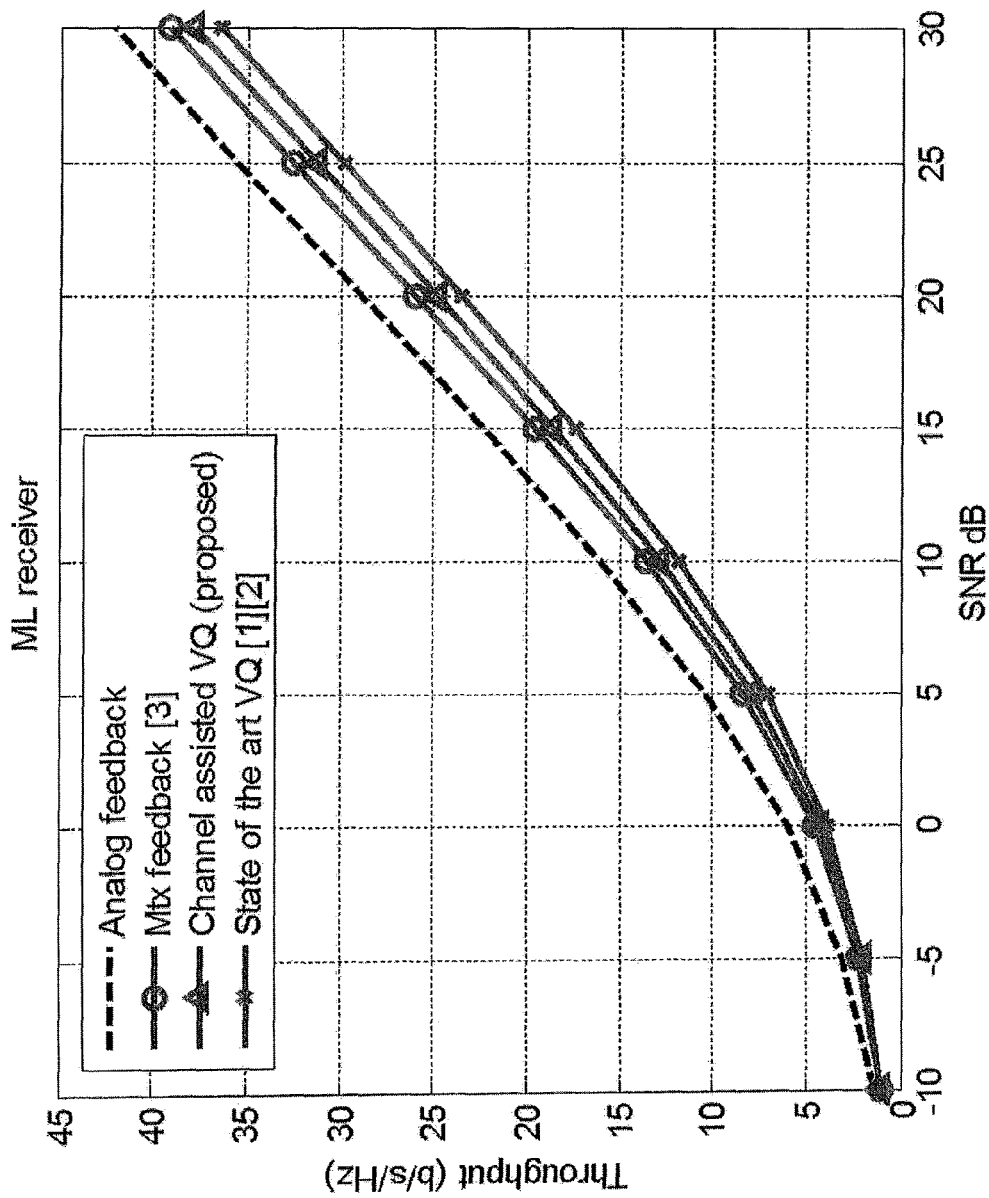
FIG. 8 is a schematic curve diagram illustrating the throughput performance of a specific realization of the present invention compared to the state of the art, assuming an ideal Maximum Likelihood (ML) receiver.

FIG. 8 is a schematic curve diagram illustrating the throughput performance of a specific realization of the present invention compared to the state of the art, assuming an ideal Maximum Likelihood (ML) receiver. FIG. 8 compares the forward link throughput of the proposed scheme with the state of the art VQ schemes. A system with 8 transmit antennas, 4 receive antennas, and rank adaptation is considered (i.e. for each Signal-to-Noise Ratio (SNR) value the best rank transmission is selected for each scheme). The feedback load is 8 bits/channel (a Rayleigh i.i.d. channel matrix is considered) and an ideal ML receiver is considered. The proposed scheme outperforms the state of the art VQ schemes for all the considered SNR values.

FIG. 8 shows the spectral efficiency of a 8×4 system with Rayleigh channel and adaptive rank selection (rank 1 . . . 4). In this example, a performance measure corresponding to $g_i(H, q_i) = \|V_f^H w_i(q_i)\|$ was used for the proposed channel-assisted scheme according to the invention.

The achieved positive result can be justified from a theoretical point of view: When objective function $g_i(H, q_i) = \|V_f^H w_i(q_i)\|$ is maximized at each iteration of the proposed scheme, the quantized transmit directions lie in the dominant subspace of the channel. With optimal ML receivers the achievable throughput is given by the mutual information:

$$C(W) = \log\det\left(I + \frac{P}{r\sigma^2} H W W^H H^H\right),$$

where it is assumed that each of the r streams is allocated equal power, P/r.

It can be shown that if the precoder W spans the favorable subspace, i.e. $W = V_f \tilde{U}$, for some arbitrary unitary matrix $\tilde{U}$, then the capacity is given by:

$$C(W) = \log\det\left(I + \frac{P}{r\sigma^2} \Lambda_f^2\right).$$

In other words, the capacity is independent of the rotation $\tilde{U}$ possibly introduced by the proposed vector selection scheme.

Figure 9:
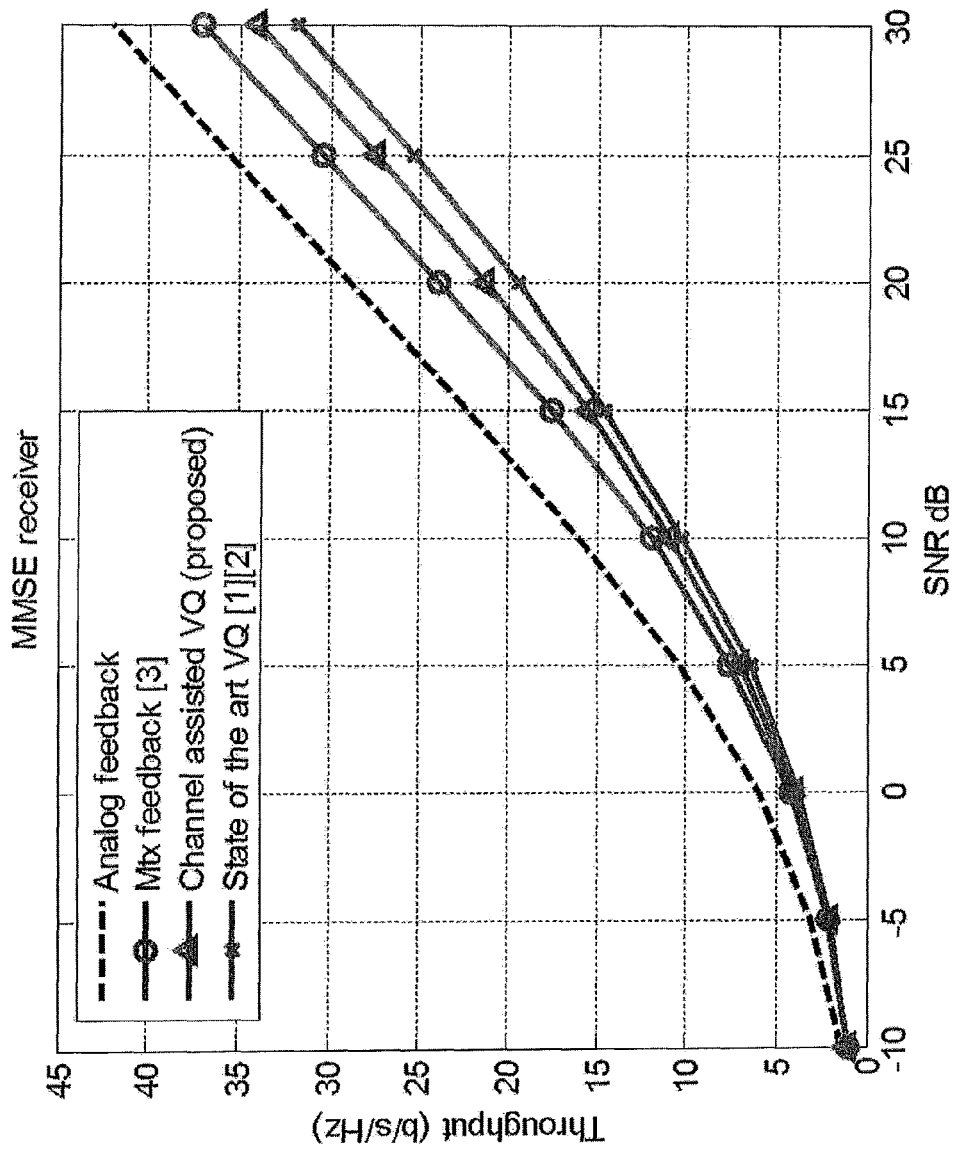
FIG. 9 is a schematic curve diagram illustrating the throughput performance of a specific realization of the present invention compared to the state of the art, assuming a linear Minimum Mean-Squared Error (MMSE) receiver.

FIG. 9 is a schematic curve diagram illustrating the throughput performance of a specific realization of the present invention compared to the state of the art, assuming a linear Minimum Mean-Squared Error (MMSE) receiver.

FIG. 9 shows the spectral efficiency of a 8×4 system with Rayleigh channel and adaptive rank selection (rank 1 . . . 4). In this example, a performance measure corresponding to $g_i(H, q_i)=\|V_f^H w_i(q_i)\|$ was used for the proposed channel-assisted scheme according to the invention.

The invention is generally applicable to precoding and multi-antenna transmissions in mobile communication networks, and particularly useful for spatial multiplexing in an LTE (Long Term Evolution) mobile communication system. It should however be noted that the invention is also applicable to other systems, including WCDMA (Wideband Code Division Multiple Access), CDMA (Code Division Multiple Access), WiMax, UMB (Ultra Mobile Broadband) and so forth.

Figure 10:
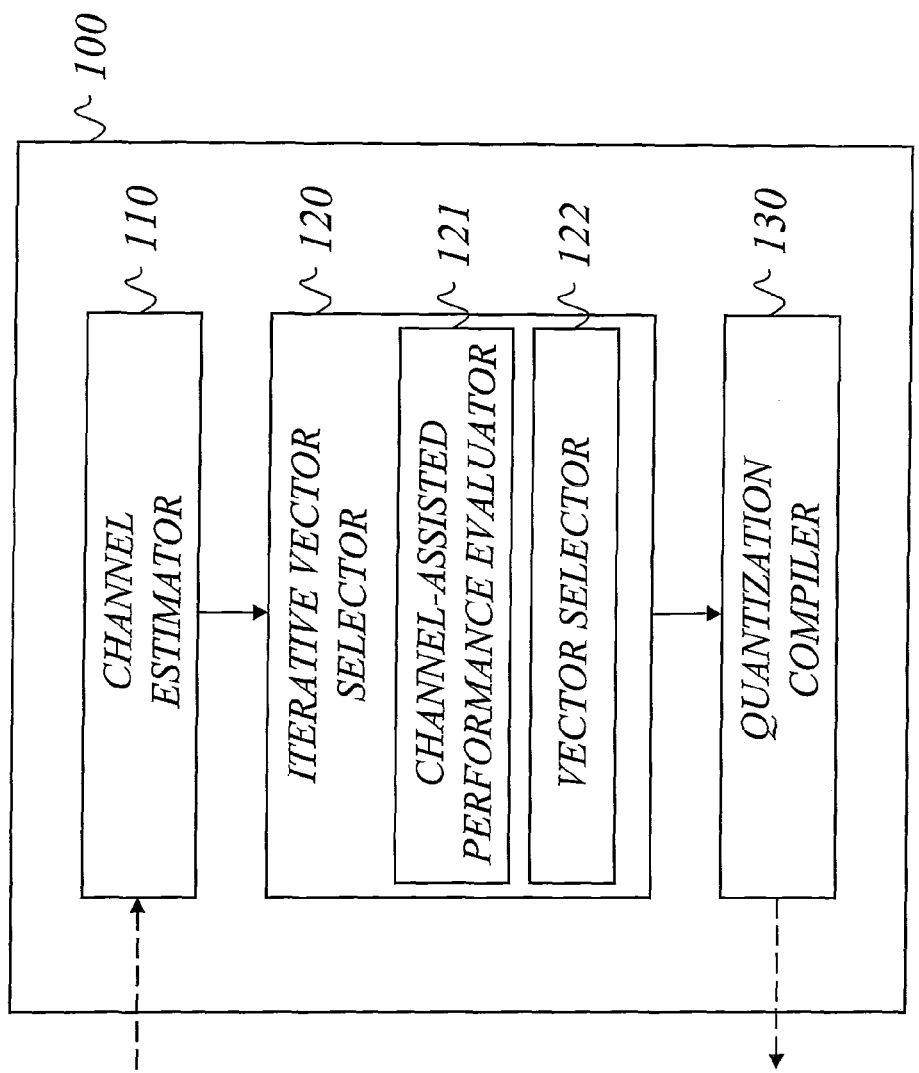
FIG. 10 is a schematic block diagram of a device for providing a quantized representation of a precoding matrix for a codebook-based precoder according to a preferred exemplary embodiment of the invention.

FIG. 10 is a schematic block diagram of a device for providing a quantized representation of a precoding matrix for a codebook-based precoder according to a preferred exemplary embodiment of the invention. The device 100 basically comprises a channel estimator 110, an iterative vector selector 120 and a quantization compiler 130. The channel estimator 110 may be any conventional channel estimator for estimating a channel matrix. The estimated channel matrix is then forwarded to the iterative vector selector 120 for use in the vector selection procedure. The iterative vector selector 120 comprises a channel-assisted performance evaluator 121 and an associated vector selector 122. The performance evaluator 121 is configured for performing, at each of a number of iterations, an evaluation of the performance of each of a number of candidate vectors from a given vector codebook with respect to a predetermined performance measure that is dependent on the estimated channel matrix. The vector selector 122 is configured for selecting, at each of the considered iterations, a vector among those candidate vectors having the highest performance to represent a respective precoding vector for the precoding matrix. The quantization compiler 130 is configured for collecting or compiling information representative of a set of selected vectors to form a quantized representation of the precoding matrix for transmission to transmitter side.

In further exemplary embodiments, the device may be configured for providing additional functionality included in any of the aspects of the previously described iterative vector selection procedure.

The device may be implemented using any technology, including hardware such as specialized hardware circuit technology, as well as any suitable combination of hardware and software.

Figure 11:
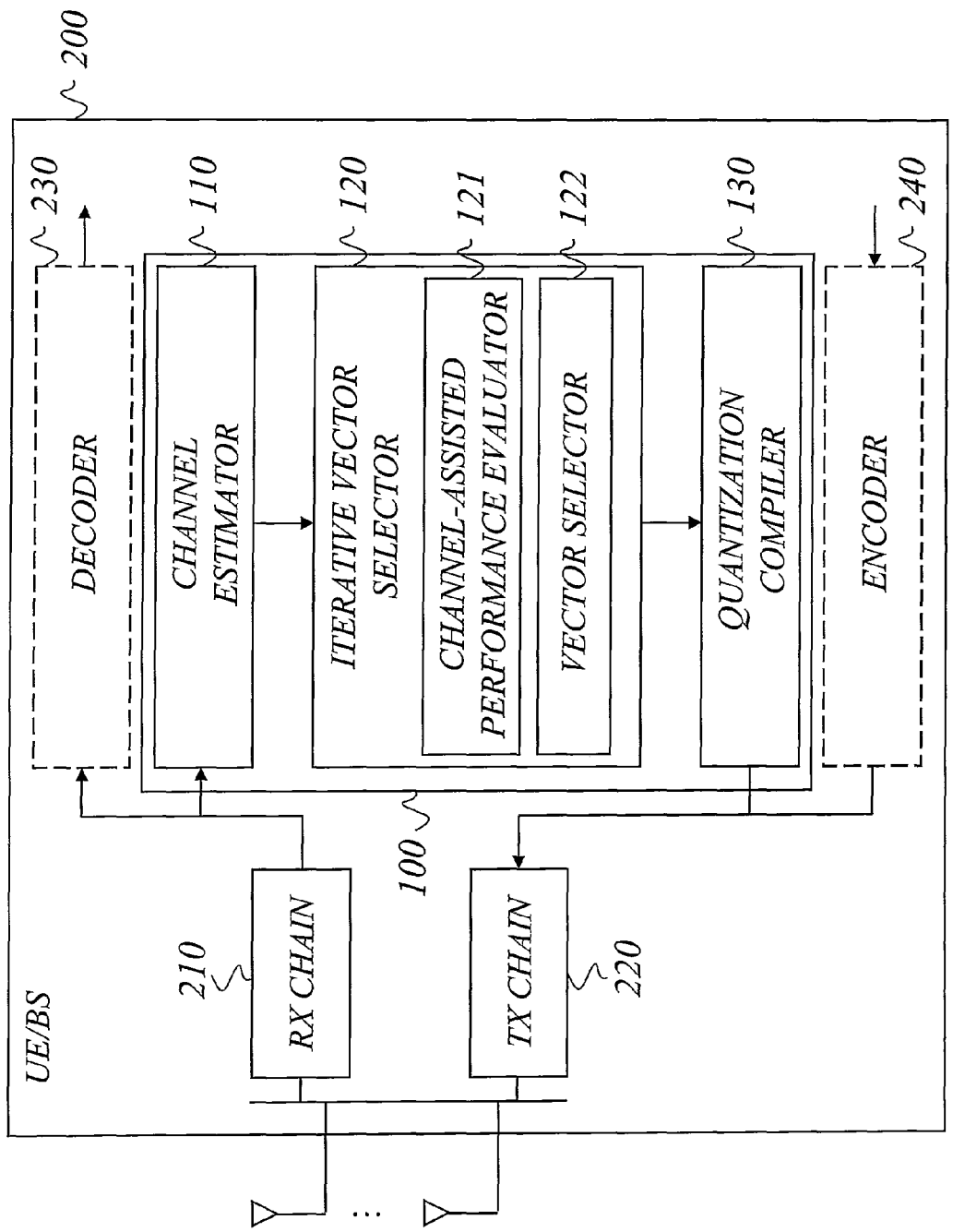
FIG. 11 is a schematic block diagram of a network node comprising a device for providing a quantized representation of a precoding matrix for a codebook-based precoder according to a preferred exemplary embodiment of the invention.

FIG. 11 is a schematic block diagram of a network node comprising a device for providing a quantized representation of a precoding matrix for a codebook-based precoder according to a preferred exemplary embodiment of the invention. The network node may be any network node, including both fixed and mobile nodes, in a mobile communications network. For example, the network node may be any user equipment (UE) such as a mobile terminal or phone. Alternatively, the network node may be a base station such as NodeB or eNodeB or any other equivalent access point unit.

The network node 200 typically has functionality for both transmission and reception, and therefore normally includes a traditional RX chain 210 for reception and a traditional TX chain 220 for transmission, and a corresponding decoder 230 and encoder 240. The network node 200 according to the present invention further comprises a device 100 for providing a quantized representation of a precoding matrix, similar to that described in connection with FIG. 10. This representation may then be transmitted to the transmitter side by means of the TX chain 220 of the network node.

Figure 12:
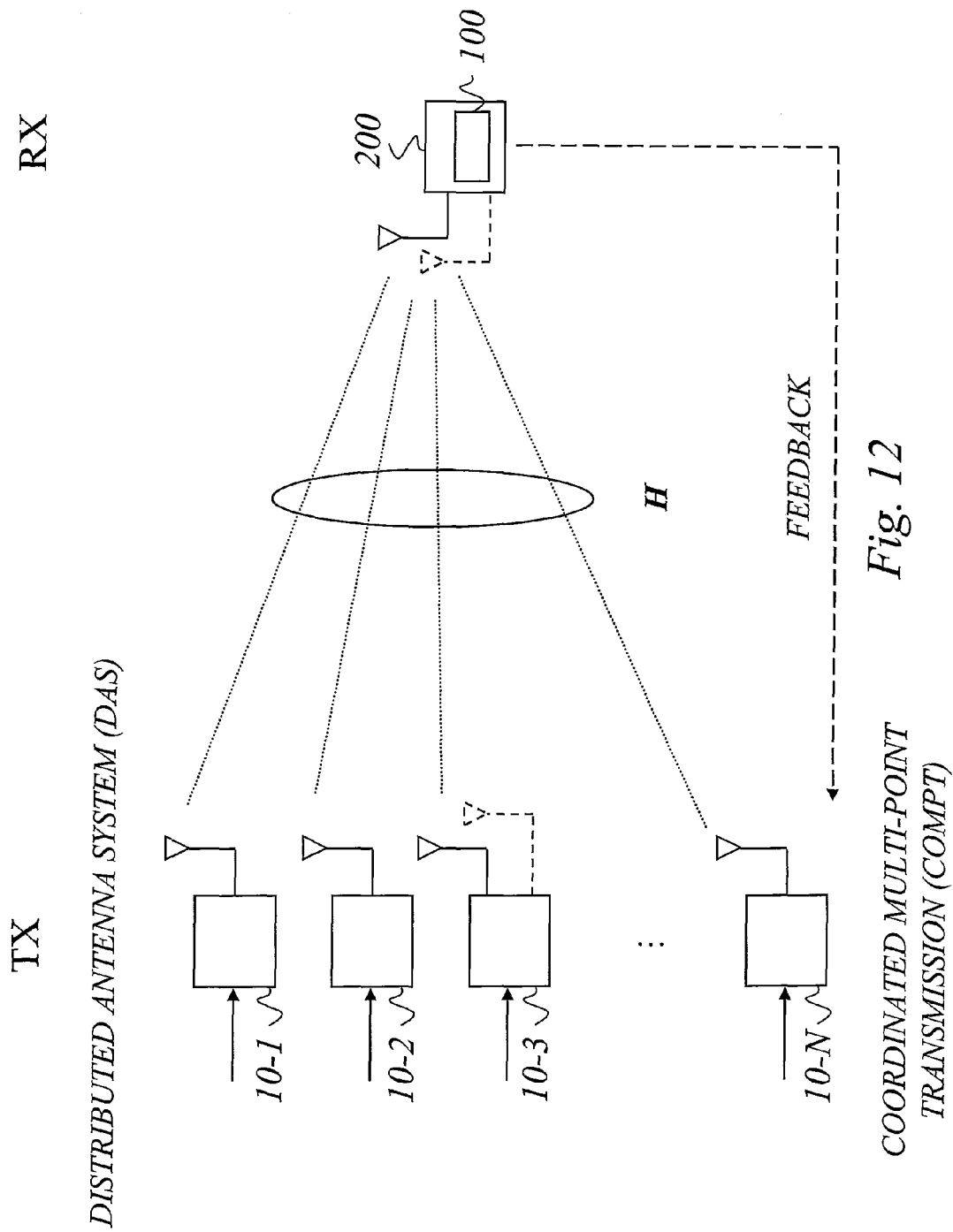
FIG. 12 is a schematic diagram illustrating a Distributed Antenna System (DAS) employing channel-assisted iterative vector selection procedure according to an exemplary embodiment of the invention.

FIG. 12 is a schematic diagram illustrating a Distributed Antenna System (DAS) employing channel-assisted iterative vector selection procedure according to an exemplary embodiment of the invention. In a DAS system, a number of distributed antenna devices 10-1 to 10-N, each having one or more antennas, are operated together for COordinated Multi-Point Transmission (COMPT) on the transmitter (TX) side. On the receiver (RX) side, there is a network node 200 having a device 100 for providing a quantized representation of a precoding matrix, similar to that described in connection with FIG. 10.

In DAS systems, the effective number of transmit antennas may be very large; thus a precoder matrix for such a system will have many elements—it will be high-dimensional. Quantizing high-dimensional matrices (or subspaces) is challenging from both a computational complexity point of view and also from a quantization error point of view. The present invention provides a quantization approach with controlled quantization errors and a computational complexity that grows gracefully with increasing precoder dimensionality. The invention in its various embodiments is therefore a good match for precoder quantization in DAS systems.

Similarly, if the DAS/COMPT system is configured to multiplex several users, using for example zero-forcing precoding where each terminal feeds back a desired signaling subspace, the proposed scheme is ideal. For example, if the desired signaling subspace is identified as the range of $V_f$, as previously defined, the user terminal may quantize this subspace efficiently using the present invention with the quantization criterion $g_i(H,q_i)=\|V_f^H w_i(q_i)\|$. The columns of the resulting quantized unitary matrix will represent a basis for a subspace that is well aligned with the range of $V_f$. The eNodeB (or base station) may next combine the desired signaling subspaces of many users and multiplex their signals in space using e.g., zero-forcing precoding.

Briefly, some of the advantages that can be offered by the present invention include:
The proposed method requires reduced computational cost with respect to matrix codebook brute force quantization. The computational gain grows with the number of antennas at the transmitter side and makes the proposed scheme attractive for high order MIMO schemes.
The proposed scheme provides better channel capacity on the forward link with respect to state of the art VQ schemes that have equivalent complexity. This is justified by the fact that, differently from state of the art schemes, the proposed method may exploit the geometrical properties of the precoder.
The proposed scheme requires reduced feedback bandwidth as compared to state of the art VQ schemes for a given target performance on the forward link.
The present invention is also well suited for DAS and COMPT systems, which have large effective channels that are challenging to quantize using matrix quantization.

The embodiments described above are merely given as examples, and it should be understood that the present invention is not limited thereto. Further modifications, changes and improvements which retain the basic underlying principles disclosed and claimed herein are within the scope of the invention.

REFERENCES

[1] David J. Love and Robert W. Heath Jr., "Limited Feedback Precoding for Spatial Multiplexing Systems", IEEE Globecom 2003.
[2] June Chul Roh and Bhaskar D. Rao, "ChannelEfficient Feedback Methods for MIMO Channels Based on Parametrization", IEEE Transactions on Wireless Communications, Vol. 6, No. 1, January 2007.
[3] Qinghua Li, Xintian Eddie Lin, "Compact Feedback for MIMO-OFDM Systems over Frequency Selective Channels", IEEE VTC 2005-Spring. Vol. 1, May 30-Jun. 1, 2005.

The invention claimed is:

1. A method for providing a quantized representation of a precoding matrix for a codebook-based precoder, said precoder being operable for precoding information symbols for multi-antenna transmission from a transmitter to a receiver in a mobile communications network, said method comprising the steps of:
   estimating a channel matrix representing multi-antenna channel characteristics between said transmitter and said receiver in said mobile communications network, said transmitter having at least two antennas and said receiver having at least one antenna;
   performing an iterative vector selection procedure for iteratively selecting precoding vectors for said precoding matrix, wherein each of a number of iterations of said iterative vector selection procedure comprises the steps of:
      evaluating performance of each one of a set of candidate vectors included in a given vector codebook with respect to a predetermined performance measure that is dependent on the estimated channel matrix; and
      selecting one of said set of candidate vectors as a respective precoding vector for said precoding matrix based on the evaluated performance; and
   compiling information representative of a set of selected precoding vectors to form said quantized representation of said precoding matrix for transmission to said transmitter.

2. The method for providing a quantized representation of a precoding matrix for a codebook-based precoder of claim 1, wherein:
   said step of evaluating performance comprises the step of mapping each one of said set of candidate vectors from a vector domain defined by said vector codebook onto a performance domain as a function of said channel-matrix dependent performance measure, and
   said step of selecting one of said set of candidate vectors as a respective precoding vector comprises the step of selecting a candidate vector among those candidate vectors in said vector domain having the highest performance in said performance domain.

3. The method for providing a quantized representation of a precoding matrix for a codebook-based precoder of claim 1, wherein:
   each of a number of iterations of said iterative vector selection procedure further comprises the step of generating said vector codebook based on precoding vectors selected in previous iterations, such that all precoding vectors, in the codebook, are orthogonal to the precoding vectors selected in previous iterations.

4. The method for providing a quantized representation of a precoding matrix for a codebook-based precoder of claim 1, wherein said performance measure is explicitly dependent, in each of said iterations, on the estimated multi-antenna dependent channel matrix.

5. The method for providing a quantized representation of a precoding matrix for a codebook-based precoder of claim 1, wherein different vector codebooks are used in different iterations of said iterative vector selection procedure.

6. The method for providing a quantized representation of a precoding matrix for a codebook-based precoder of claim 1, wherein said performance measure is related to the rate of information that can be reliably transmitted over the wireless link between said transmitter and said receiver.

7. The method for providing a quantized representation of a precoding matrix for a codebook-based precoder of claim 6, wherein said performance measure is based on a matrix product of a weighting matrix and the considered candidate vector, wherein said weighting matrix is dependent on the estimated channel matrix.

8. The method for providing a quantized representation of a precoding matrix for a codebook-based precoder of claim 7, wherein said weighting matrix is the estimated channel matrix.

9. The method for providing a quantized representation of a precoding matrix for a codebook-based precoder of claim 7, wherein said weighting matrix is a selected sub-space of the channel matrix.

10. The method for providing a quantized representation of a precoding matrix for a codebook-based precoder of claim 9, wherein said selected sub-space of the channel matrix is a performance favorable sub-space.

11. The method for providing a quantized representation of a precoding matrix for a codebook-based precoder of claim 6, wherein said performance measure represents link capacity.

12. The method for providing a quantized representation of a precoding matrix for a codebook-based precoder of claim 1, wherein said transmitter is configured as a Distributed Antenna System (DAS) for COordinated Multi-Point Transmission (COMPT).

13. The method for providing a quantized representation of a precoding matrix for a codebook-based precoder of claim 1,
   wherein said steps of estimating, performing and compiling are performed in said receiver, and
   said method further comprises the step of transmitting said quantized representation of said precoding matrix to said transmitter.

14. The method for providing a quantized representation of a precoding matrix for a codebook-based precoder of claim 1, wherein said channel matrix is estimated for one or a set of sub-carriers.

15. The method for providing a quantized representation of a precoding matrix for a codebook-based precoder of claim 1, wherein said precoding and multi-antenna transmission is configured for spatial multiplexing in an LTE (Long Term Evolution) mobile communication system.

16. A device for providing a quantized representation of a precoding matrix for a codebook-based precoder, said precoder being operable for precoding information symbols for multi-antenna transmission from a transmitter to a receiver in a mobile communications network, said device comprising:
   a channel estimator that estimates a channel matrix representing multi-antenna channel characteristics between said transmitter and said receiver in said mobile communications network, said transmitter having at least two antennas and said receiver having at least one antenna;

an iterative vector selector that performs an iterative vector selection procedure for iteratively selecting precoding vectors for said precoding matrix, wherein said iterative vector selector comprises:
a channel-assisted performance evaluator that evaluates, at each of a number of iterations of said iterative vector selection procedure, performance of each one of a set of candidate vectors included in a given vector codebook with respect to a predetermined performance measure that is dependent on the estimated channel matrix; and
a vector selector that selects, at each of a number of iterations of said iterative vector selection procedure, one of said set of candidate vectors as a respective precoding vector for said precoding matrix based on the evaluated performance; and
a quantization compiler that compiles information representative of a set of selected precoding vectors to form said quantized representation of said precoding matrix for transmission to said transmitter.

17. The device for providing a quantized representation of a precoding matrix for a codebook-based precoder of claim 16, wherein:
said channel-assisted performance evaluator is configured for mapping each one of said set of candidate vectors from a vector domain defined by said vector codebook onto a performance domain as a function of said channel-matrix dependent performance measure, and
said vector selector is configured for selecting a candidate vector among those candidate vectors in said vector domain having the highest performance in said performance domain.

18. The device for providing a quantized representation of a precoding matrix for a codebook-based precoder of claim 16,
wherein said iterative vector selector is configured for generating, at each of a number of iterations of said iterative vector selection procedure, said vector codebook based on precoding vectors selected in previous iterations, such that all precoding vectors, in the codebook, are orthogonal to the precoding vectors selected in previous iterations.

19. The device for providing a quantized representation of a precoding matrix for a codebook-based precoder of claim 16, wherein said performance measure is explicitly dependent, in each of said iterations, on the estimated multi-antenna dependent channel matrix.

20. The device for providing a quantized representation of a precoding matrix for a codebook-based precoder of claim 16, wherein different vector codebooks are used in different iterations of said iterative vector selection procedure.

21. The device for providing a quantized representation of a precoding matrix for a codebook-based precoder of claim 16, wherein said performance measure is related to the rate of information that can be reliably transmitted over the wireless link between said transmitter and said receiver.

22. The device for providing a quantized representation of a precoding matrix for a codebook-based precoder of claim 21, wherein said performance measure is based on a matrix product of a weighting matrix and the considered candidate vector, wherein said weighting matrix is dependent on the estimated channel matrix.

23. The device for providing a quantized representation of a precoding matrix for a codebook-based precoder of claim 22, wherein said weighting matrix is the estimated channel matrix.

24. The device for providing a quantized representation of a precoding matrix for a codebook-based precoder of claim 22, wherein said weighting matrix is a selected sub-space of the channel matrix.

25. The device for providing a quantized representation of a precoding matrix for a codebook-based precoder of claim 24, wherein said selected sub-space of the channel matrix is a performance favorable sub-space.

26. The device for providing a quantized representation of a precoding matrix for a codebook-based precoder of claim 21, wherein said performance measure represents link capacity.

27. The device for providing a quantized representation of a precoding matrix for a codebook-based precoder of claim 16, wherein said transmitter is configured as a Distributed Antenna System (DAS) for COordinated Multi-Point Transmission (COMPT).

28. The device for providing a quantized representation of a precoding matrix for a codebook-based precoder of claim 16, wherein said channel estimator, iterative vector selector, and quantization compiler are implemented in said receiver, and said device is configured for enabling transmission of said quantized representation of said precoding matrix to said transmitter.

29. The device for providing a quantized representation of a precoding matrix for a codebook-based precoder of claim 16, wherein said channel matrix is estimated for one or a set of sub-carriers.

30. The device for providing a quantized representation of a precoding matrix for a codebook-based precoder of claim 16, wherein said precoder is configured for spatial multiplexing in an LTE (Long Term Evolution) mobile communication system.

31. A network node for a mobile communications network, said network node comprising a device of claim 16.

32. The network node of claim 31, wherein said network node is a user equipment.

33. The network node of claim 31, wherein said network node is a base station such as an eNodeB.

* * * * *

UNITED STATES PATENT AND TRADEMARK OFFICE
CERTIFICATE OF CORRECTION

PATENT NO.       : 8,619,904 B2                          Page 1 of 1
APPLICATION NO.  : 13/124817
DATED            : December 31, 2013
INVENTOR(S)      : Hammarwall et al.

It is certified that error appears in the above-identified patent and that said Letters Patent is hereby corrected as shown below:

In the Specification

In Column 5, Line 60, delete "$r_f$;" and insert -- $r_f$, --, therefor.

In Column 7, Line 29, delete "$\check{W}_i$," and insert -- $\widehat{W}_i$, --, therefor.

In Column 8, Line 60, delete "not n use" and insert -- not use --, therefor.

Signed and Sealed this
Fifteenth Day of July, 2014

Michelle K. Lee
*Deputy Director of the United States Patent and Trademark Office*